(12) United States Patent
Diefenbacher et al.

(10) Patent No.: US 7,347,413 B2
(45) Date of Patent: Mar. 25, 2008

(54) TRAY COLUMN AND METHOD FOR MASS TRANSFER IN A TRAY COLUMN

(75) Inventors: Armin Diefenbacher, Germersheim (DE); Ulrich Hammon, Mannheim (DE); Thomas Walter, Hassloch (DE); Bruno Seider, Waghaeusel (DE); Wolfgang Schneider, Bad Duerkheim (DE); Bernd Gerber, Ludwigshafen (DE); Volker Schliephake, Schifferstadt (DE); Michael Blechschmitt, Schifferstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 265 days.

(21) Appl. No.: 11/302,206

(22) Filed: Dec. 14, 2005

(65) Prior Publication Data

US 2006/0131766 A1    Jun. 22, 2006

(30) Foreign Application Priority Data

Dec. 22, 2004   (DE) .................... 10 2004 061 773

(51) Int. Cl.
*B01F 3/04*       (2006.01)
(52) U.S. Cl. ................ 261/114.1; 261/114.5
(58) Field of Classification Search .. 261/114.1–114.5; 202/158; 203/71
See application file for complete search history.

(56) References Cited

U.S. PATENT DOCUMENTS

| | | | | |
|---|---|---|---|---|
| 2,210,808 A | * | 8/1940 | Glitsch .................... | 261/114.2 |
| 2,376,940 A | * | 5/1945 | Riemenschneider ..... | 261/114.2 |
| 2,575,186 A | * | 11/1951 | Ryant, Jr. ................ | 261/114.1 |
| 2,611,457 A | * | 9/1952 | Glitsch .................... | 261/114.1 |
| 3,642,258 A | * | 2/1972 | Stahl et al. ................ | 261/113 |
| 4,133,852 A | * | 1/1979 | DiNicolantonio et al. ....................... | 261/114.5 |
| 5,788,895 A | | 8/1998 | Altinger et al. | |
| 6,214,174 B1 | * | 4/2001 | Matsumoto et al. .......... | 203/86 |
| 6,267,359 B1 | * | 7/2001 | Stippick .................. | 261/114.5 |
| 7,055,810 B2 | * | 6/2006 | Gage ........................ | 261/114.1 |

FOREIGN PATENT DOCUMENTS

| | | |
|---|---|---|
| DE | 195 30 291 A1 | 2/1997 |
| EP | 0 856 343 B1 | 1/2004 |

\* cited by examiner

*Primary Examiner*—Scott Bushey
(74) *Attorney, Agent, or Firm*—Oblon, Spivak, McClelland, Maier & Neustadt, P.C.

(57) ABSTRACT

A tray column is proposed which includes
column trays,
two or more supports which are arranged on the underside of the column trays and support them and
a bearing ring for the column trays on the inner wall of the tray column,
wherein three-way joints of inner column wall, bearing ring and support are prevented by cutouts in the bearing ring.

8 Claims, 1 Drawing Sheet

TRAY COLUMN AND METHOD FOR MASS TRANSFER IN A TRAY COLUMN

DESCRIPTION

Figure 1:
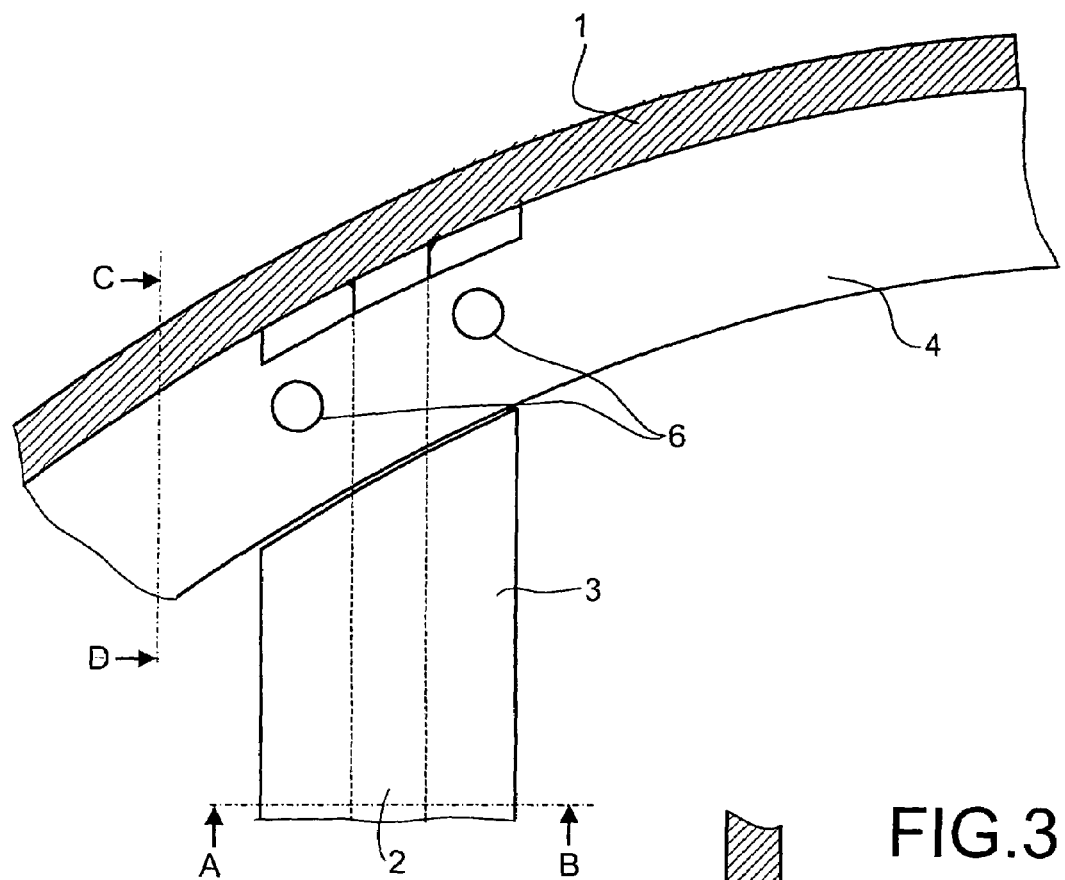

The invention relates to a tray column and to a method for mass transfer in a tray column.

Tray columns are used for a multitude of mass transfer processes between liquids and gases. In these processes, a liquid is conducted from the top downward in countercurrent to a gas phase. As this occurs, the gas which flows through orifices in the column trays is fed into the liquid, so that intensive mass transfer takes place. The liquid is passed on to the next lowest column tray in each case either by specific drain devices, in particular tray shafts (in the case of crossflow trays) or via orifices in the column trays (in the case of dual-flow trays).

There are a multitude of different tray types, for example sieve trays, dual-flow trays, bubble-cap trays or valve trays.

In the case of tray columns having relatively large diameters, the trays are generally not in one piece, but rather composed of a plurality of column tray segments (tray plates).

In order to ensure mechanical stability, especially at the high stress by the liquid in operation, the column trays or column tray segments are supported by supports which are arranged horizontally on the underside of the column trays. The supports are frequently T-shaped.

On the inner column wall, a bearing ring for the column trays is generally provided. The column tray segments secured to the supports may be connected to one another by means of clamps or clamping bars, especially screw-connected. The bearing ring is generally welded to the column wall.

In all of the constructions mentioned, only very fine apertures, if any, in particular capillary gaps (hairline gaps), are formed at the joining lines of tray plates to one another or to supporting elements (supports) or to screw connections of the tray parts. In such fine apertures, the residence time of the liquid is many times higher than the average residence time on the column tray. In the case of certain substances, this leads to polymerization, coagulation, caking or other undesired physical or chemical changes. Frequently, the hairline gaps are only the starting point of such reactions, which then continue on the column tray.

In the case of products which tend to foul or polymerize, for example acrylic acid, usually tray columns, preferably columns having sieve trays or dual-flow trays (trickle sieve trays), are used.

In processes in which products tending to polymerize are used in such tray columns, it is known that the operating conditions can be adjusted so as to achieve a very uniform, not excessively large residence time of the liquid phase on the individual trays. Furthermore, it is regarded as favorable for the reduction in the fouling tendency to prevent sites which are sometimes or never wetted with stabilizer-containing liquid.

In order to reduce the fouling problems, DE-A 195 30 291 has therefore proposed a column tray in which the majority, preferably the entirety, of the supporting elements are connected in a liquid-tight manner, preferably welded, to one another and to the column wall and the bearing ring, in particular in discrete flat elements and, at the same time, the majority, preferably the entirety, of the adjacent tray plates and supporting elements are separated from one another and from the column wall and the bearing ring by gaps with a width of from 1 mm to 15 mm, preferably from 1 mm to 7 mm.

Thus, formation of undesired gaps is counteracted by, on the one hand, making the gaps large enough to prevent the disadvantageous reactions described, and, on the other hand, small areas being sealed so effectively that gap formation can be prevented with an acceptable level of technical complexity. It is particularly advantageous in this context to form small-surface area weld bonds between the components to be bonded, since this advantageously allows a liquid-tight bond to be created.

EP-B 0 856 343 proposes a further solution for the fouling problems in tray columns, according to which orifices are provided in a supporting element for a column tray, in particular the bearing ring, through which the liquid can flow away.

Accordingly, it was an object of the invention to provide a further improvement of column trays, by which simple construction measures achieve a further reduction in the polymerization problems.

Accordingly, a tray column has been found which comprises column trays, two or more supports which are arranged on the underside of the column trays and support them and a bearing ring for the column trays on the inner wall of the tray column, wherein three-way joints of inner column wall, bearing ring and support are prevented by cutouts in the bearing ring.

The inventors have recognized the joints between support, column wall and bearing ring as particularly critical starting points for chemical or physical changes which lead to fouling.

By virtue of appropriate cutouts in the bearing ring, three-way joints between inner column wall, bearing ring and support are prevented. The geometry of the cutouts is not crucial in this context; what is essential is the function, specifically that the downflow of liquid through the cutout is ensured without this significantly impairing the support function of the bearing ring. For this purpose, a width of the cutout of >1 mm, frequently >3 mm, preferably >5 mm, is generally suitable.

The cutouts may preferably be formed in a rectangular shape.

Frequently, T-shaped supports with a horizontal and a vertical part are used. In this case, the horizontal part of the supports also has to be correspondingly cut out in the region of the cutouts in the bearing ring.

The cutouts can preferably be provided in the horizontal part of the support over the entire width of the bearing ring.

However, it is also possible that the horizontal part of the T-shaped support is not cut out over the entire width of the bearing ring. In this case, the horizontal part of the T-shaped support either has to be bonded to the bearing ring in a liquid-tight manner, in particular welded, in which case the weld seam is preferably ground smoothly, or has to be separated by a gap which is sufficiently wide that liquid can flow away unhindered. Suitable gap widths for this purpose are the same as specified above for the cutouts in the bearing ring.

In addition, orifices, for example circular drillholes, may be provided in the bearing ring, preferably at the points at which the supports adjoin the bearing ring.

The invention also provides a method for mass transfer in a tray column comprising column trays, two or more supports which are arranged on the underside of the column trays and support them and a bearing ring for the column trays on the inner wall of the tray column, wherein 3-way joints of inner column wall, bearing ring and support are prevented by cutouts in the bearing ring. This may in particular be a distillation, stripping or absorption.

It is particularly suitable for use in processes in which (meth)acrylic acid and/or its esters are treated.

The invention is illustrated in detail hereinbelow with reference to a figure.

Figure 2:
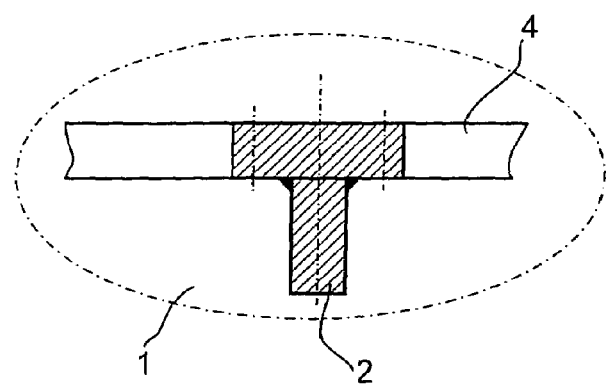
Figure 3:
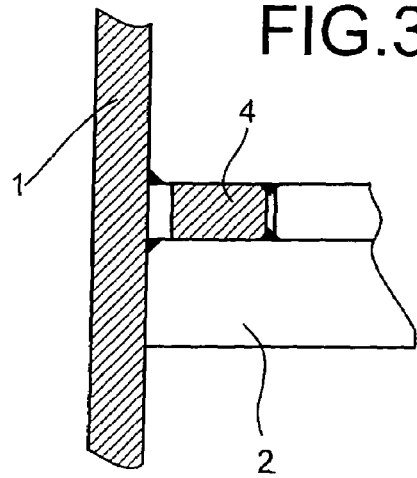

The figures show:

FIG. 1 a section from an embodiment of an inventive tray column in the horizontal plane, FIG. 2 a section in the vertical plane through a T support and FIG. 3 a further section through a T support in a vertical plane which is rotated by 90° compared to the plane shown in FIG. 2.

FIG. 1 shows a horizontal section from a tray column with inner wall 1, t supports with vertical part 2 and horizontal part 3 and bearing ring 4, a cutout 5 being provided in the bearing ring 4 in the region of the joint of the support 2, 3 to the inner wall 1. In the preferred embodiment shown in the figure, orifices 6 are additionally provided in the region in which the T support 2, 3 adjoins the bearing ring 4.

The vertical section in FIG. 2 illustrates that the support in the region of the support ring 4 consists exclusively of the vertical part 2.

FIG. 3 too, which is a further vertical section in a sectional plane which is rotated by 90° compared to FIG. 2, shows that the horizontal part 3 of the support is cut out, i.e., in the region in which inner wall 1, bearing ring 4 and support adjoin, the support is formed exclusively from the vertical part 2.

What is claimed is:

1. A tray column comprising
   column trays,
   two or more supports which are arranged on the underside of the column trays and support them and
   a bearing ring for the column trays on the inner wall of the tray column,
   wherein 3-way joints of inner column wall, bearing ring and support are prevented by cutouts in the bearing ring.

2. The tray column according to claim 1, wherein the supports are t-shaped and are formed with a horizontal and a vertical part, and the horizontal part thereof is likewise cut out in the region of the cutouts in the bearing ring.

3. The tray column according to claim 2, wherein the horizontal part of the supports is cut out over the entire width of the bearing ring.

4. The tray column according to claim 1 or 2, wherein orifices are provided in the bearing ring, preferably at the points at which supports adjoin the bearing ring.

5. The tray column according to claim 1 or 2, wherein the cutouts in the bearing ring are rectangular.

6. A method for mass transfer in a tray column comprising column trays, two or more supports which are arranged on the underside of the column trays and support them and a bearing ring for the column trays on the inner wall of the tray column, wherein 3-way joints of inner column wall, bearing ring and support are prevented by cutouts in the bearing ring.

7. The method according to claim 6, which is a distillation, stripping or absorption.

8. The method according to claim 6, wherein (meth) acrylic acid and/or esters thereof are treated therein.

* * * * *